Figure 1:
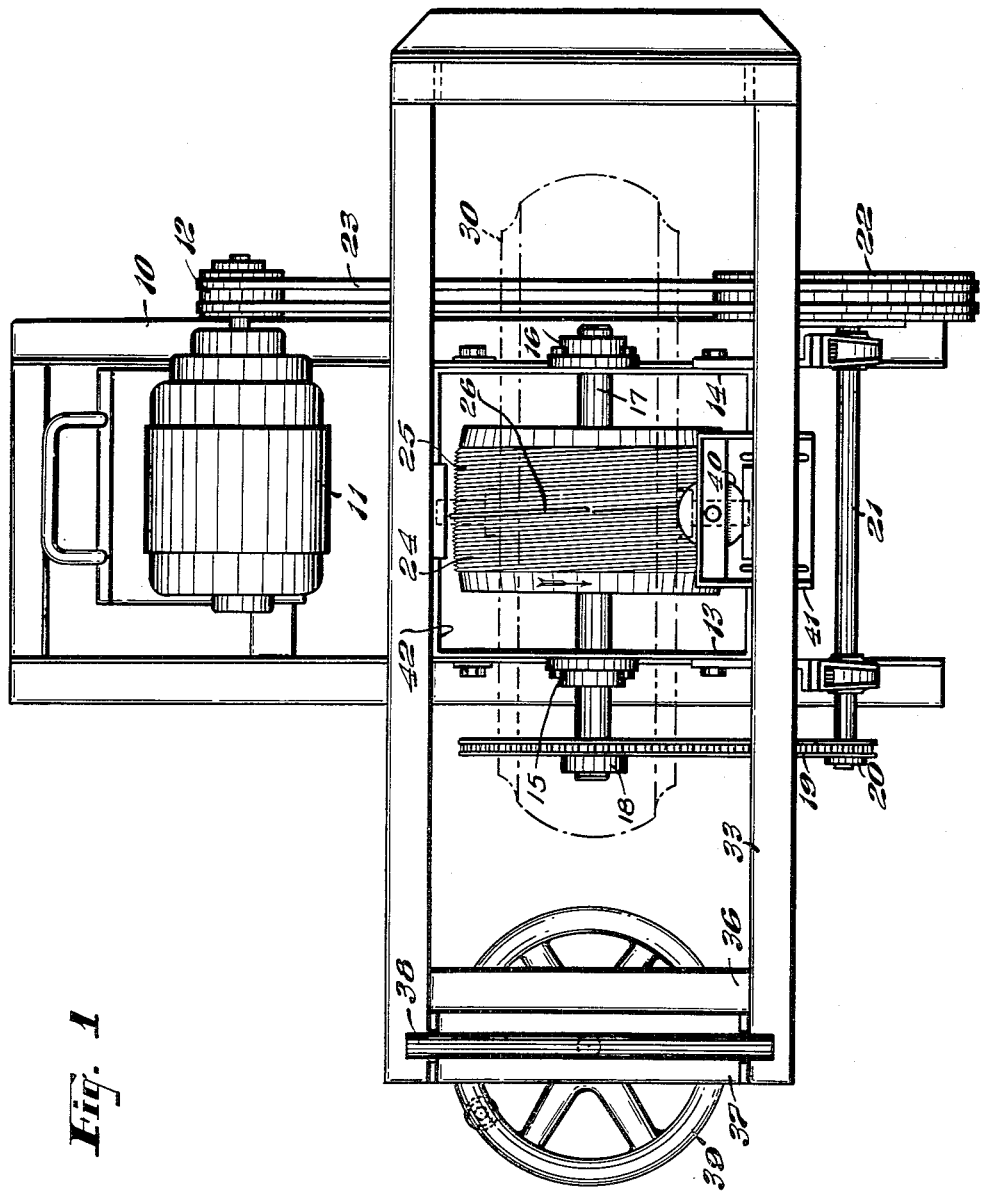

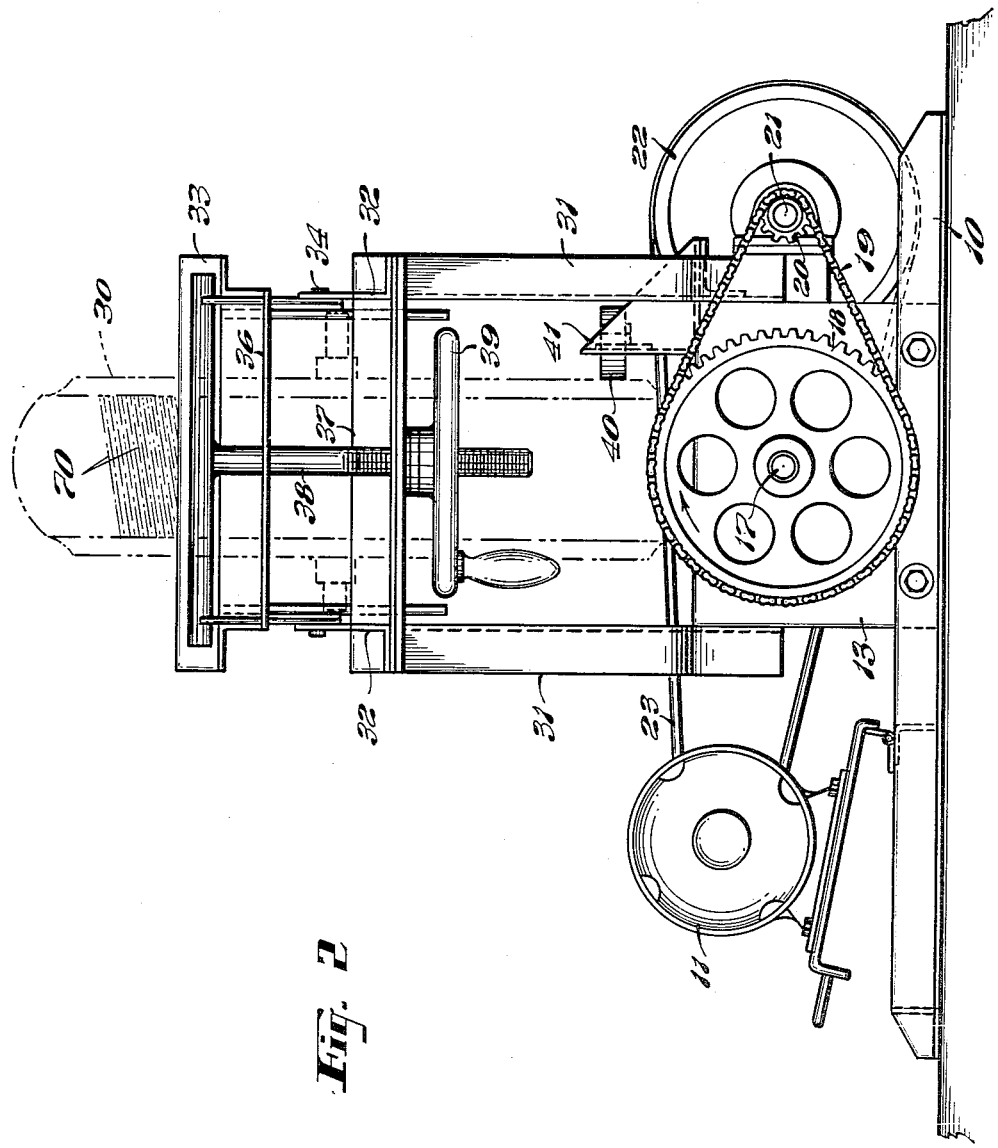

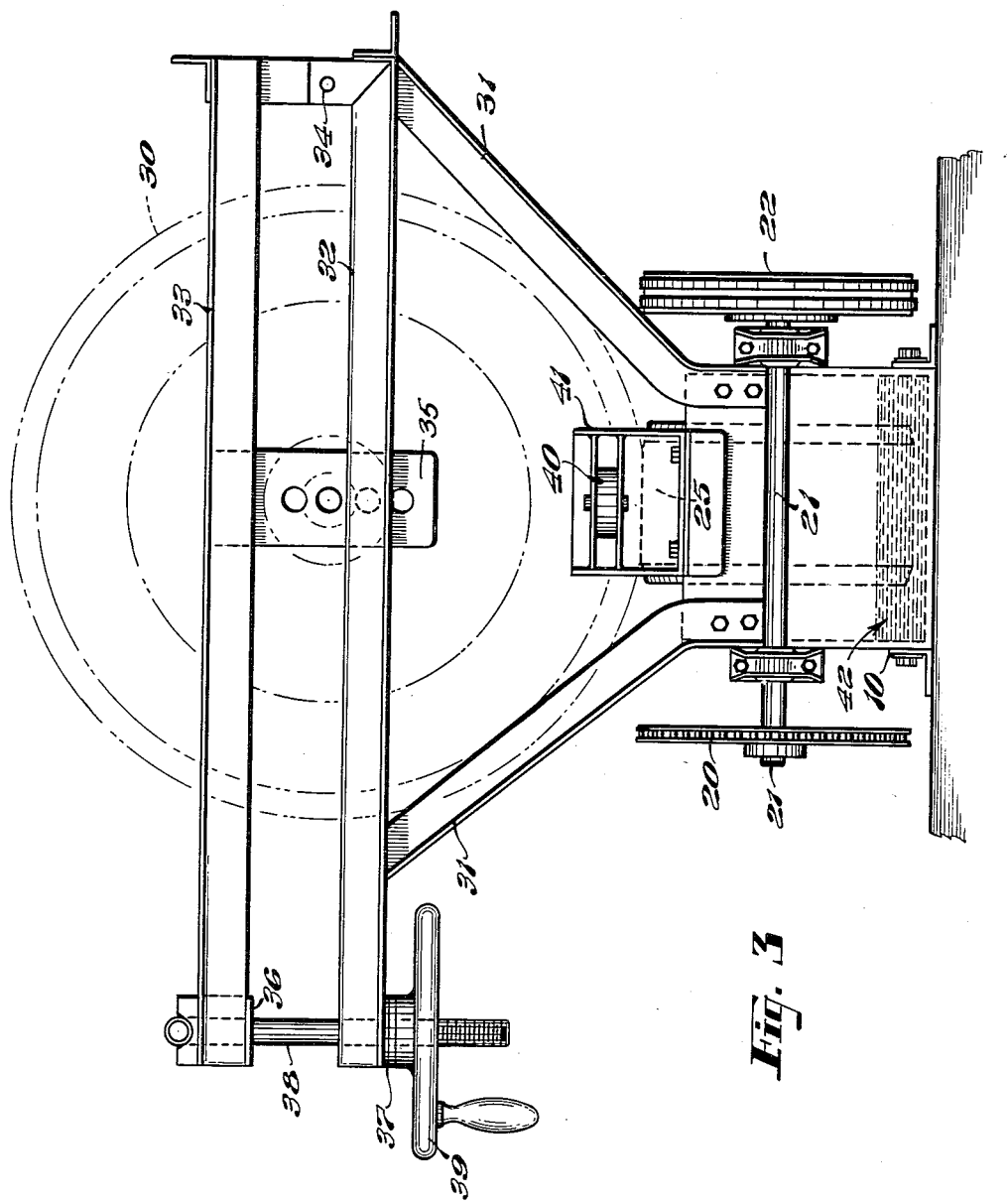

April 10, 1956　　F. C. MESERVE ET AL　　2,741,307
MACHINE AND PROCESS FOR SLITTING TIRES
Filed Dec. 28, 1953　　5 Sheets-Sheet 4
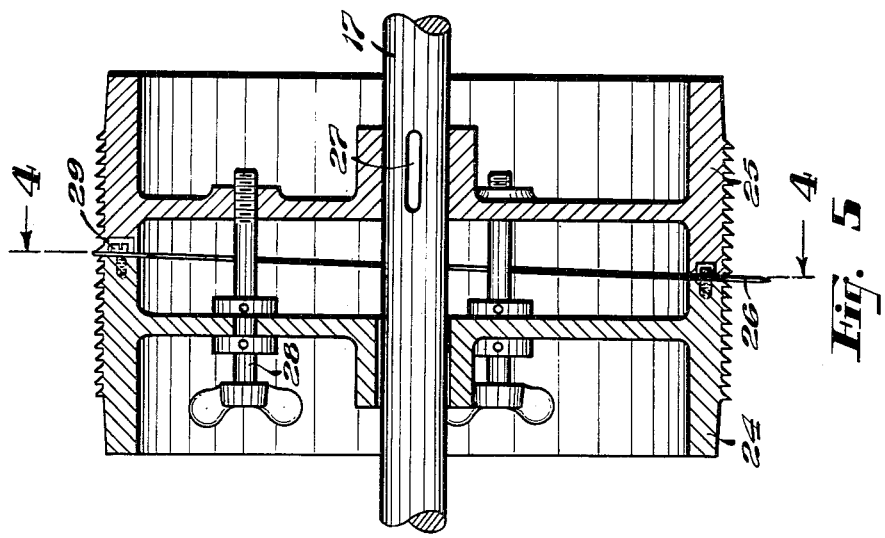
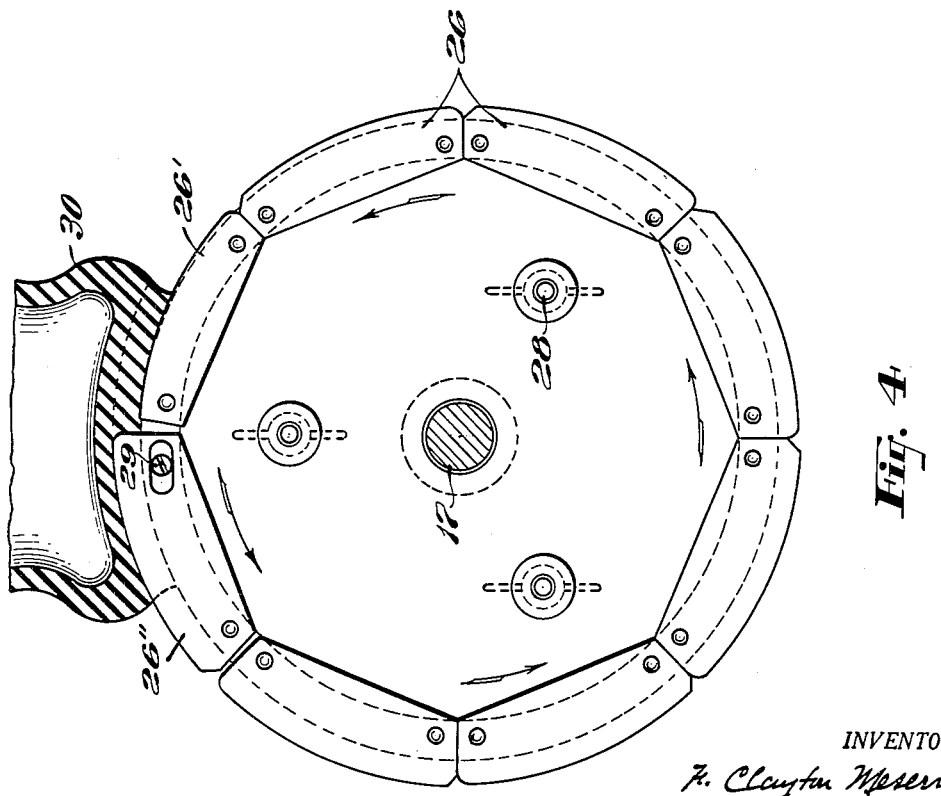
INVENTORS
F. Clayton Meserve &
Minot F. Smith.
by Kenway, Jenney, Witter & Hildreth,
Attys.

April 10, 1956 F. C. MESERVE ET AL 2,741,307
MACHINE AND PROCESS FOR SLITTING TIRES
Filed Dec. 28, 1953 5 Sheets-Sheet 5

INVENTORS.
F. Clayton Meserve &
Minot F. Smith
by Kenway, Janney, Witter & Hildreth
Attys.

United States Patent Office 2,741,307
Patented Apr. 10, 1956

2,741,307
MACHINE AND PROCESS FOR SLITTING TIRES

Forrest Clayton Meserve, Andover, and Minot F. Smith, Wellesley, Mass.

Application December 28, 1953, Serial No. 400,688

10 Claims. (Cl. 164—10.2)

This invention comprises a novel process employing a continuously running knife for slitting tires and a new and improved machine by which the process may be carried out either while the tire remains in place on the wheel of the vehicle or while independently supported.

It has been found beneficial in the treads of pneumatic tires to provide closely spaced transverse slits which function to provide the tire with certain desirable anti-skid properties in use, and which augment the braking effect and so increase in general the safety of driving. The depth to which these closely spaced slits may be extended into a tire by existing means is limited to about ¼ inch. It is desirable also to recut used tires to the original depth when the tread has been worn down so that the original cuts are too shallow to be effective, and to cut new tire treads deeper originally so that they will retain their anti-skid properties longer, even for the full life of the tire.

An object of the present invention is to provide a tire cutting or slitting machine so constructed and arranged that tire treads may be provided with uniformly closely spaced transverse slits of any desired depth allowable by the thickness of the rubber in the tread and if desired, without removing the tire or the wheel from the vehicle.

The present invention comprises as one important feature novel means for continuously and uniformly rotating the tire in proper relation to the slitting knife. This means, as herein shown, comprises a rotary member, such as a drum or the like having its tire-engaging surface provided with spiral threads or with unsharpened helical ribs which, in operation, are pressed into the yielding tread face of the tire without cutting it and cause the tire to rotate in the fashion of a worm drive. When a drum is used it may be of integral construction or it may be formed in sections that can be clamped together on a helical knife or knife blades. The rotation of the tire by worm drive constitutes a distinguishing process step of the present invention.

Another important feature of the invention is a slitting knife of helical contour. Such a knife may be advantageously employed in carrying out a novel process of slitting, that is to say, of forming consecutive closely spaced slits across and through the tread of the tire parallel to each other and all inclined at an acute angle to the axis of the tire.

The knife is also important in that it may be embodied in a compact, efficient and accurate slitting mechanism. It may be rotated continuously or intermittently and combined with any suitable form of tire-rotating mechanism, although it may be combined with particular advantage with a rotary feeding drum of the type above described. This is because the worm drive of the drum threads relieves the knife of all feeding stress, permitting the employment of a thin knife and insuring that the slitting operation is carried out on rubber which is relaxed and not stretched or compressed by feeding pressure on the knife. Preferably and as herein shown, the knife gradually increases in effective cutting height from the leading point it first enters the tread of the tire to the trailing point which leaves it at the completion of a single cut or slash. A knife or knives of this character provides a slicing or carving action on the tread allowing uniform deep cuts to be made with very close spacing and without any tearing of the tire or variations in the spacing of the cuts.

Figure 6:
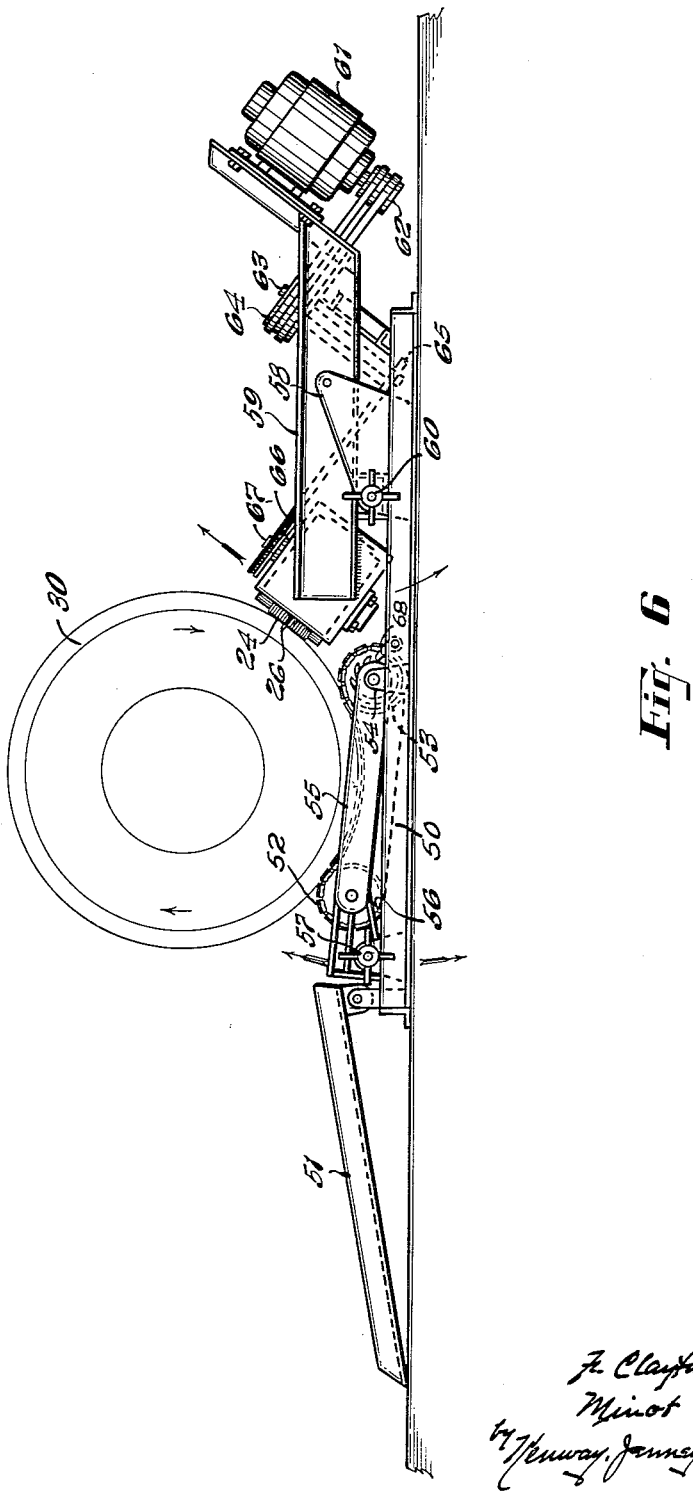

These and other features of the invention will be best understood and appreciated from the following description of preferred embodiments of the mechanism selected for purposes of illustration and shown in the accompanying drawings in which:

Fig. 1 is a plan view of the machine,
Fig. 2 is a view in end elevation,
Fig. 3 is a view in side elevation,
Fig. 4 is a view in elevation showing the slitting knife in its relation to one of the drum sections,
Fig. 5 is a sectional view of the drum, and
Fig. 6 is a view in elevation of a machine of modified construction.

The machine comprises a base 10 which carries an upstanding frame and a motor 11 having a driving pulley 12. The frame includes side plates 13 and 14 to which are secured bearings 15 and 16 for the main shaft 17 of the machine and these support the shaft at both ends for rotation about a horizontal axis. This shaft is provided at its left end, as shown in Fig. 1, with a large sprocket wheel 18 driven by a chain 19 from a sprocket 20 on one end of a jack shaft 21. This shaft is journaled in bearings carried by the frame of the machine and provided with a pulley 22 by which it is driven through a pair of V-belts 23 by the pulley 12 of the motor.

The shaft 17 carries drum sections 24 and 25 which are provided circumferentially with a helical thread or worm teeth of the character shown in Fig. 5. These teeth are of unsharpened buttress type and well adapted to impress corresponding grooves temporarily in the yielding material of a tire tread pressed against them and so to rotate the tire in worm and wheel fashion and without cutting it.

The drum section 25 is keyed to the shaft 17 by means of a key 27 and thus fast thereon. The section 24 is slidable on the shaft and connected to the section 25 by three clamping bolts 28 which are threaded into bosses of the web of the section 25 and engage the web of the section 24 by spaced collars, all as shown in Fig. 5.

The cutting or slitting knife as herein shown comprises a series of segments 26 which are located in the drum sections 24 by dowel pins one of which, 29, is eccentrically mounted so that the effective cutting height of the trailing knife section 26″ may be adjusted. It will be noted that the effective height of the knife sections 26 progressively increases from the leading section 26′ to the trailing section 26″. This arrangement is advantageous in that it insures a slicing cut gradually increasing in depth with minimum disturbance of the material of the tire tread. In Fig. 4 a tire 30 is shown as partially deflated, resting upon and conformed to the contour of the threaded drum in deformed condition so that the resulting slit or cut will extend in uniform depth across the width of the tread.

The knife sections 26 are disposed in the form of a helix as shown in Fig. 1, that is to say, the leading end is offset with respect to the trailing end in an amount substantially equal to the pitch of the threads of the drum. It will be apparent, therefore, that as the tire 30 is rotated by its worm drive relation to the drum, the effective portion of the knife will travel in exact timed relation to the movement of the tread. As the trailing end of the knife emerges from one cut, the leading end of the knife will enter the tread at a point determined by the pitch of the thread. This may be in the order of 0.0625", or any other desired spacing. The meeting faces of the drum sections 24 and 25 are of corresponding helical shape and cooperate in holding the knife sections in their helical contour.

The tire may be rotatably supported upon the drum 24—25 in any suitable manner. As herein shown the frame includes outwardly and upwardly inclined supporting arms 31 which carry at their upper end a horizontally disposed rectangular stationary frame 32. To the right hand end of this frame, as shown in Fig. 3, a double arm 33 is pivoted to swing about a cross pin 34 carried by a part of the frame 32. The pivoted double arms carry a downwardly extending bearing bracket 35 having a series of perforations to receive a spindle or arbor for the wheel on which the tire is mounted. The double arms 33 are connected at their free end by a transverse connecting bar 36, and the stationary frame 32 includes a transverse connecting bar 37. A T-bolt 38, provided with a nut and hand wheel 39 at its lower end, connects the double arm 33 with the stationary frame 32 and the hand wheel may be manipulated to press the tire downwardly into conformed relation with the thread of the drum 24—25.

A guide roll 40 is shown as mounted in a bracket 41 on the frame and this is arranged to run against the side face of the tire and to resist the transverse thrust of the slitting knife in its passage through the tread of the tire. The frame may include side walls forming a tank partially enclosing the threaded drum 24—25 as shown in Fig. 3 and containing a liquid lubricant 42 through which the knife passes in each revolution of the drum and by being thus lubricated facilitates the cutting operation. The drum itself dips into the liquid lubricant 42 and thus its threads are constantly lubricated for their engagement with the tire.

In operation a wheel or other rotary support with a partially deflated tire is mounted on a mandrel set in the bearing bracket 35 and the hand wheel 39 is turned to press the lower side of the tire firmly against the threaded drum 24—25 and to flatten and conform the tread transversely to the curvature of the drum as shown in Fig. 4. The motor 11 is then started and the shaft 17 rotated in clockwise direction as shown in Fig. 2. The low leading end of the lubricated knife section 26' immediately enters the tread of the tire thus starting a shallow transverse cut or slash at an angle corresponding to the pitch angle of the worn tread. Simultaneously the tire is rotated by the threads of the drum about its axis at a linear speed corresponding to the longitudinal travel of the worm threads, for example 0.0625 inch for one complete turn of the drum. During this time the other knife sections 26 come into action and form the slit or cut deeper and deeper with a slicing cut until the full depth is reached by the trailing end of the knife section 26". The rotation of the tire and the transverse slitting or cutting operations continue without interruption while the tire makes a complete revolution. In re-cutting a worn tire the knife may be located in a previously formed slit whereupon the slitting operation is picked up with the original spacing of the slits. At the conclusion of the operation the tire is released by reverse movement of the hand wheel 39. It will be noted that the drum presents threads on both sides of the knife 26, that is, threads engaging and leading the tread of the tire to the knife and also threads engaging and feeding tread away from the knife.

A machine of modified construction is shown in Fig. 6 which is organized to handle conveniently a tire while the wheel remains on the vehicle. As herein shown this machine comprises an elongated base 50 carrying at one end a pivotal mounted ramp 51 which leads upwardly to a cradle provided by a sprocket chain 52. The sprocket chain 52 is continuous and at one end runs upon a sprocket wheel 53 journaled in a stationary bearing bracket 54. A double arm 55 is pivotally mounted to swing about the axis of the sprocket wheel 53 and carries at its free end a sprocket wheel 56 over which the sprocket chain 52 runs. The bracket 55 is extended toward the ramp and supported by an eccentric carried by a transverse shaft 57 and operated by a hand wheel. By this means the sprocket wheel 56 may be raised or lowered and the effective support of the cradle thus shifted longitudinally to accommodate wheels of different diameter.

The base 50 carries a pair of upwardly projecting brackets 58 between which is pivoted an angular frame 59. The frame rests upon an eccentric carried by a transverse shaft 60 operated by a hand wheel for rocking the frame 59 to adjust the angular position of the slitting mechanism carried thereby. At its rear end the frame 59 carries a motor 61 having a driving pulley 62 and arranged to drive a jack shaft 63 through a double belt and pulley 64 on the upper end of the jack shaft. At its lower end the shaft 63 carries a sprocket 65 about which runs a sprocket chain 66 arranged to drive a shaft 67 through a larger sprocket fast to its upper end. The shaft 67 carries drum sections 24 and 25 and helical slitting or cutting knife 26 that may be identical to the corresponding elements already described. The drum is maintained in tangential relation to the tire and in operation the slitting of the tire may proceed as already explained. While adjustment of the machine for tires of different diameter is effected by manipulation of the eccentrics on the shafts 57 and 60 a ratchet and pawl 68 is associated with the sprocket wheel 53 to prevent retrograde movement of the sprocket chain 52 of the cradle.

As shown in Fig. 2 the slits 70 are closely arranged in parallel relation and at an acute angle with respect to the axis of the tire corresponding substantially with the pitch angle of the worm thread on the drum 24—25. In practice we have found that the blades 26 operate successfully and with long life when made of steel 0.008" in thickness.

It will be apparent that by elevating the sprocket wheel 56 and so in effect tilting the cradle upwardly at its left end, the tire is caused to press firmly against the threaded drum 24—25 and the slitting knife 26.

Having thus disclosed our invention and described in detail illustrative embodiments thereof, we claim as new and desire to secure by Letters Patent:

1. The process of slitting tires which is characterized by progressively conforming the tread of the tire, in successive areas, to the contour of a worm thread, rotating the tire by turning the worm thread while it temporarily indents but does not cut the tire and moving a knife through the tread of the tire in a path corresponding to the pitch of said worm thread and following the formation of the indentations made by the worm threads.

2. The process of slitting tires as defined in claim 1 further characterized in that the tire is indented by the worm threads on the approaching side of the knife.

3. The process of slitting tires as defined in claim 1 further characterized in that the tire is indented by the worm thread on both sides of the knife.

4. The process of slitting tires as defined in claim 1 further characterized in that the tire is forcibly flattened in that part of its circumference which is indented by the worm thread.

5. The process of slitting tires as defined in claim 1 further characterized in that the marginal areas of that part of the tire which is indented by the worm thread are given a pronounced concave curvature, whereby tongues are formed which are defined by transverse division lines all inclined at an acute angle to the axis of the tire.

6. A tire slitting machine comprising means for rotatably supporting a tire, a drum having tire-feeding helical unsharpened threads projecting from its cylindrical surface, means for driving the drum with its threads imbedded in but not cutting the tread surface of the tire and thereby rotating the tire, a helical knife projecting from the drum within its threaded area, said helical knife extending farther from the drum than said helical threads but otherwise conforming to the helix of the threads, and a reservoir of liquid lubricant so located that a portion of the rotating drum is immersed in the lubricant and the contact of its threads and the tread surface constantly lubricated.

7. A tire slitting machine having a continuously rotated spirally threaded drum, said threads being of a height and nature temporarily to indent and feed the tire forward but not to cut the same, means for supporting the tire on said drum so as to be driven thereby and a continuously driven slitting knife located between the ends of the drum, said knife conforming to the spiral shape of said threads of the drum and being of a height and sharpness to make slits in the tire.

8. A tire slitting machine as defined in claim 7 further characterized in that means are provided for adjusting the effective height of the slitting knife.

9. A tire slitting machine as defined in claim 7 further characterized in that the slitting knife comprises a series of thin blades secured in the body of the drum and projecting in helical contour beyond the threads thereof.

10. A tire slitting machine as defined in claim 7 further characterized in that the drum comprises sections keyed together and having helical complementary end faces between which the helical slitting knife is clamped.

References Cited in the file of this patent

UNITED STATES PATENTS

| | | |
|---|---|---|
| 162,841 | Mayer | May 4, 1875 |
| 317,612 | Barton | May 12, 1885 |
| 737,430 | Lyon | Aug. 25, 1903 |
| 1,016,011 | Himoff | Jan. 30, 1912 |
| 2,167,017 | Wikle | July 25, 1939 |
| 2,180,556 | Sipe | Nov. 21, 1939 |
| 2,183,376 | Wikle | Dec. 14, 1939 |
| 2,575,450 | Huff | Nov. 20, 1951 |
| 2,652,892 | Cumfer | Sept. 22, 1953 |

FOREIGN PATENTS

| | | |
|---|---|---|
| 427,143 | Great Britain | Apr. 16, 1935 |
| 718,992 | Germany | Mar. 26, 1942 |
| 723,079 | Germany | July 29, 1942 |